J. SHEPHERD.
ELECTRICAL GENERATOR AND MOTOR.
APPLICATION FILED JUNE 5, 1919.
1,384,864.
Patented July 19, 1921.
6 SHEETS—SHEET 1.
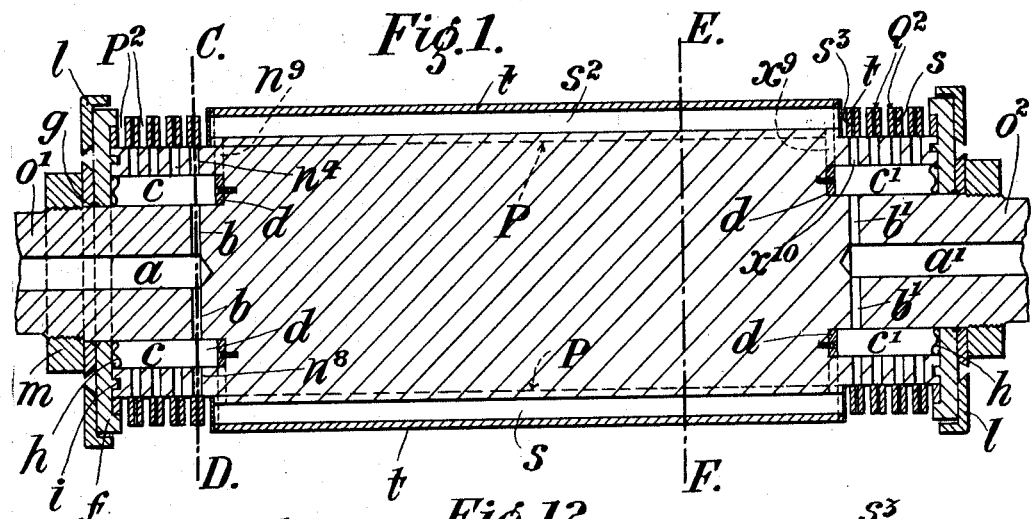
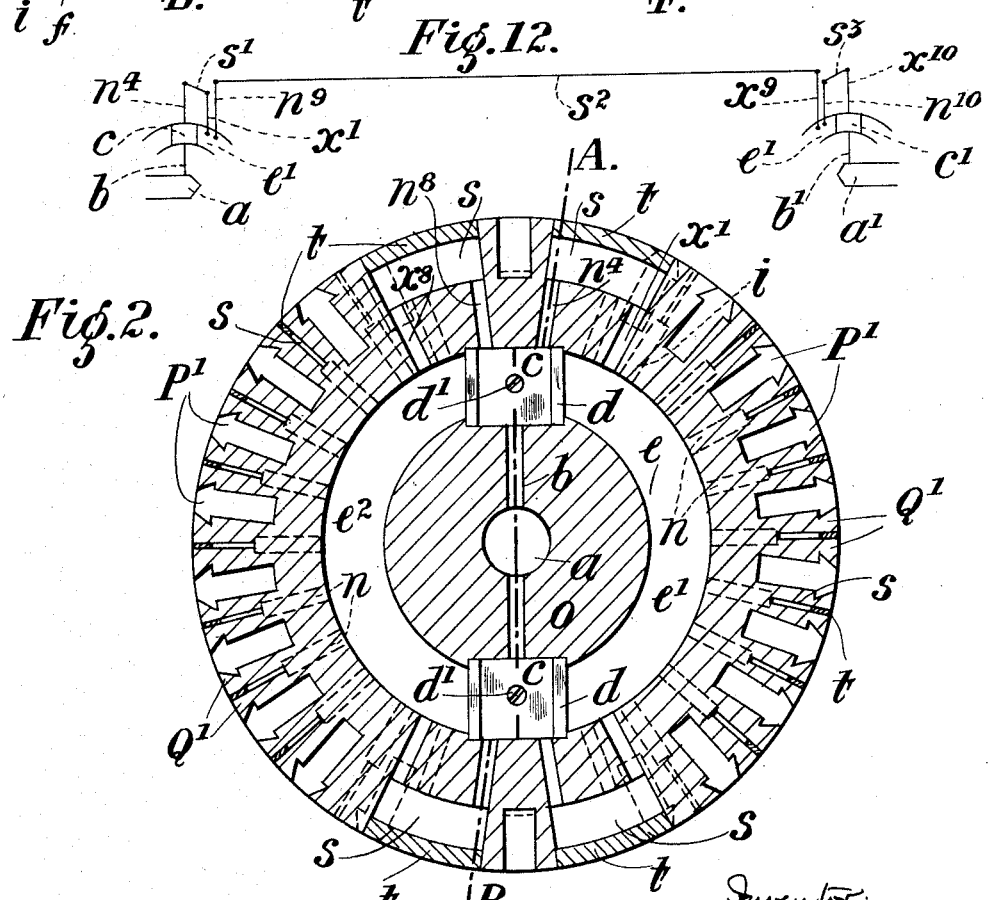

J. SHEPHERD.
ELECTRICAL GENERATOR AND MOTOR.
APPLICATION FILED JUNE 5, 1919.

1,384,864.

Patented July 19, 1921.
6 SHEETS—SHEET 2.

Inventor.
Joseph Shepherd
By Jos. Jochum Jr.
atty.

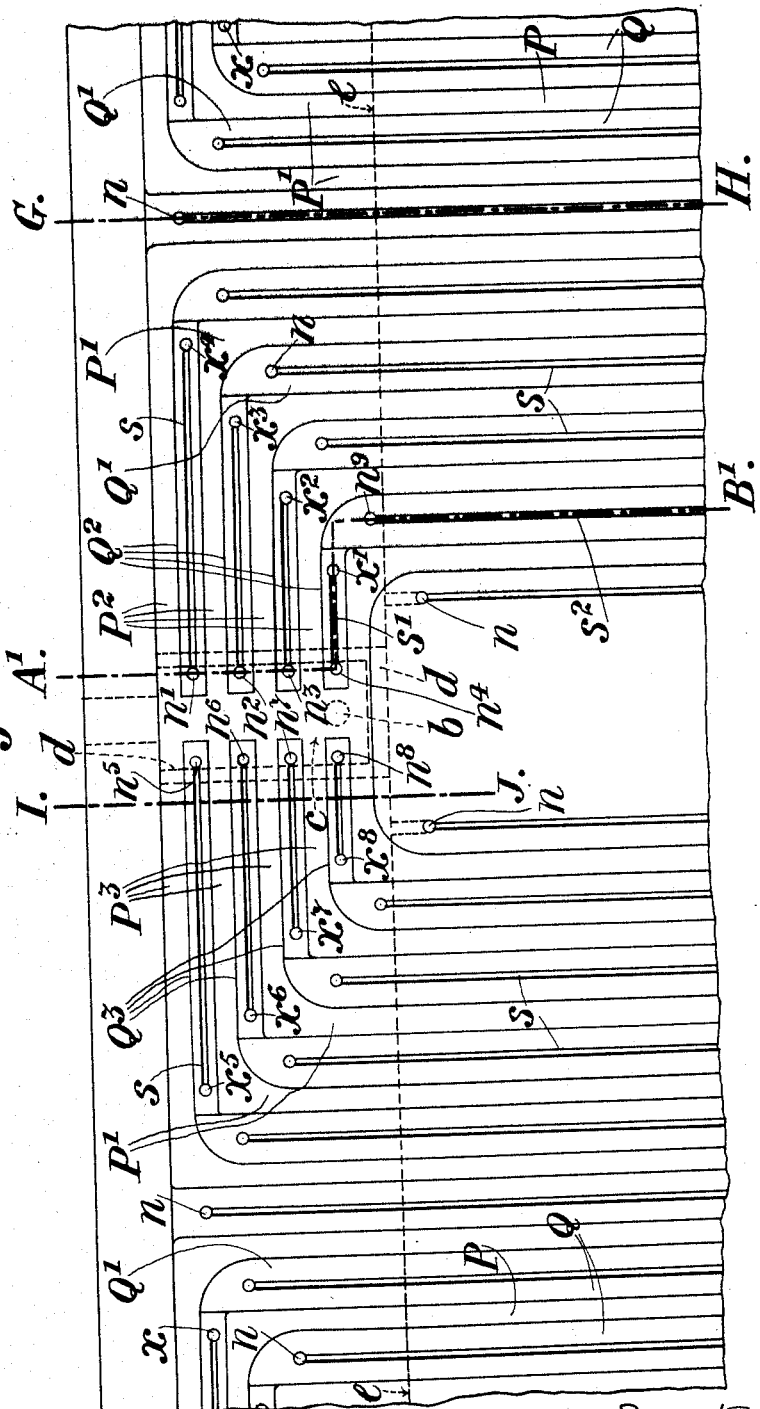

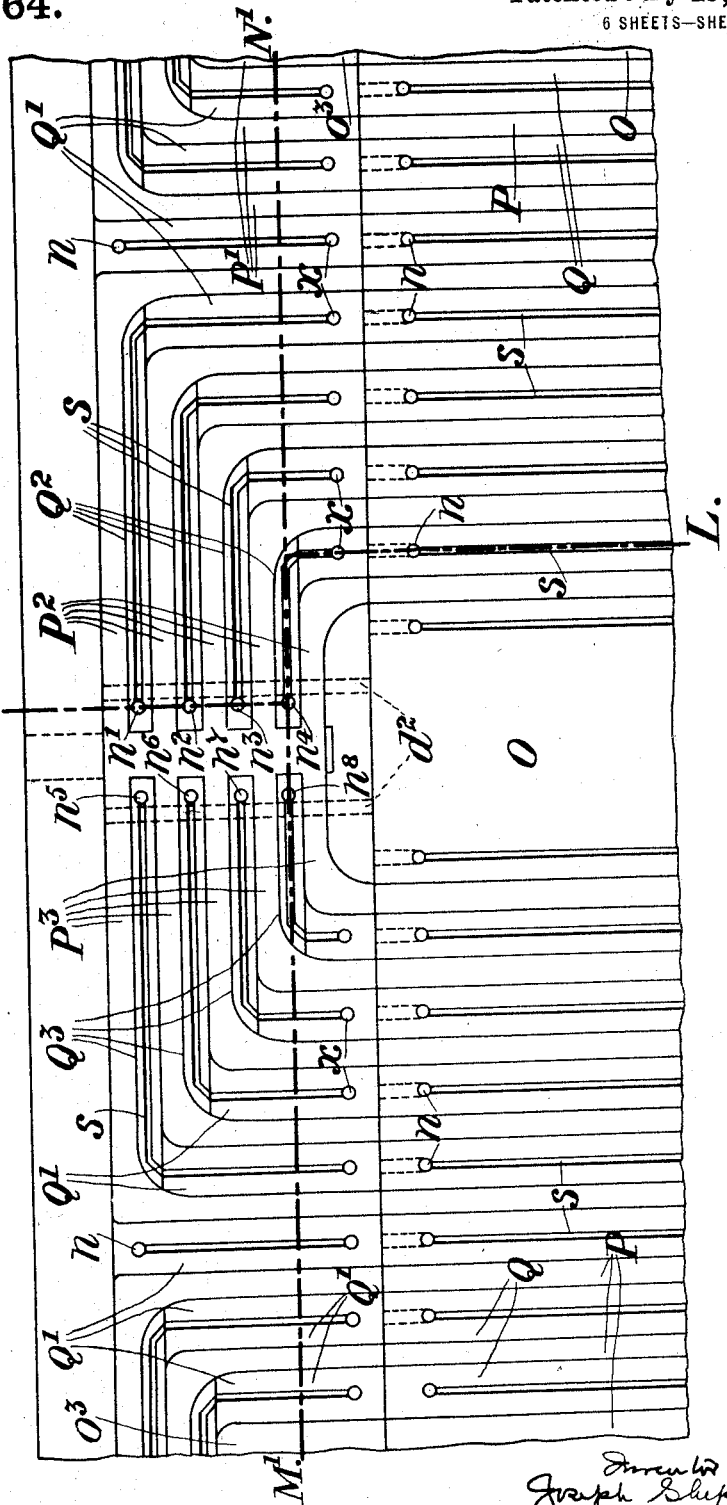

J. SHEPHERD.
ELECTRICAL GENERATOR AND MOTOR.
APPLICATION FILED JUNE 5, 1919.
1,384,864.
Patented July 19, 1921.
6 SHEETS—SHEET 6.
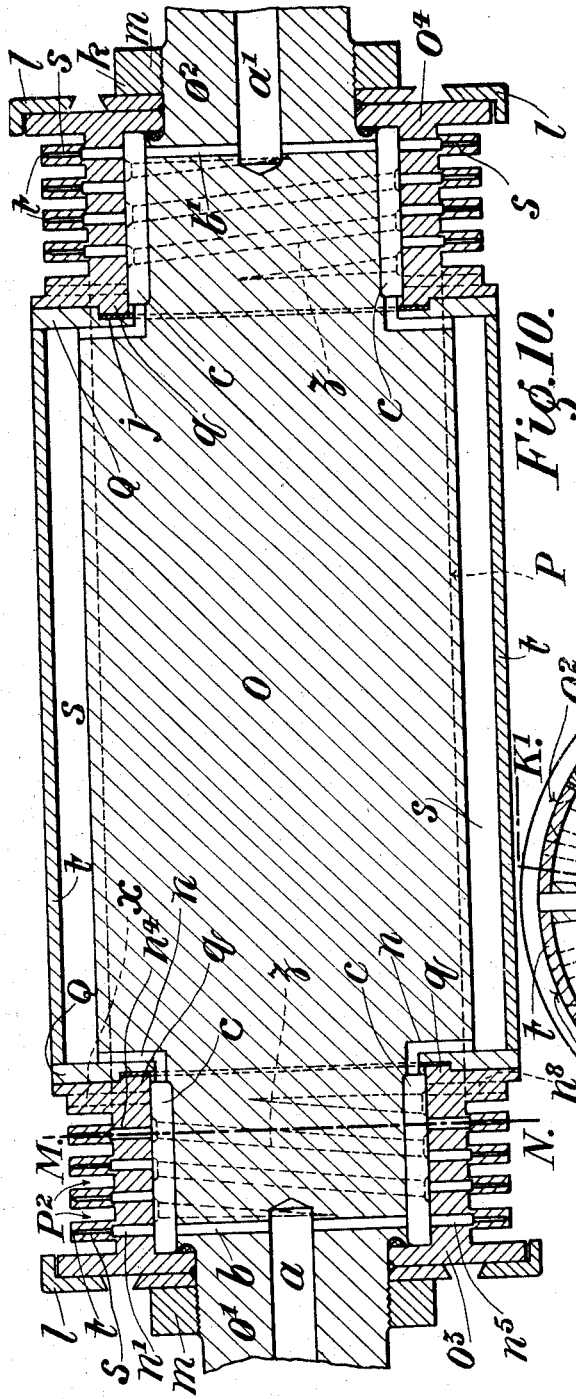
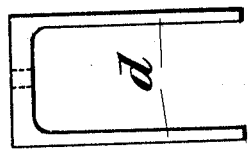
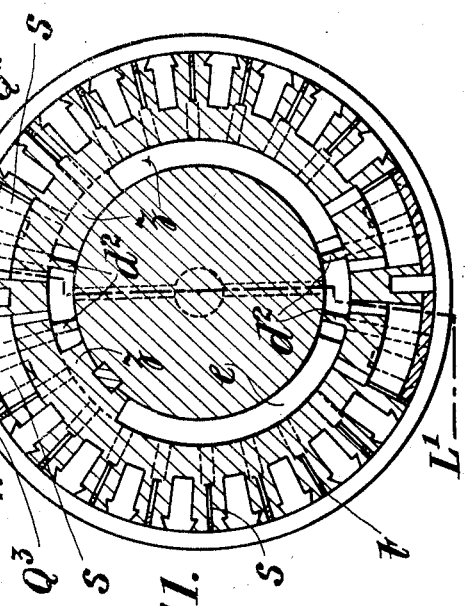

UNITED STATES PATENT OFFICE.

JOSEPH SHEPHERD, OF LEEDS, ENGLAND.

ELECTRICAL GENERATOR AND MOTOR.

1,384,864.

Specification of Letters Patent.  Patented July 19, 1921.

Application filed June 5, 1919. Serial No. 301,882.

*To all whom it may concern:*

Be it known that I, JOSEPH SHEPHERD, of Leeds, England, a subject of the King of Great Britain, have invented certain new and useful Improvements in Electrical Generators and Motors, of which the following is a specification.

This invention relates to electrical generators and electric motors.

The effective cooling of the rotor windings of an electrical generator or motor is a problem which presents considerable difficulty and, especially is this the case with dynamo electric machinery of large output, such as turbo-generators running at high speeds. In the past it has been usual to effect the cooling either by air ventilation or by liquid circulation and, in the latter system, it has been proposed to cool the portions of the windings of the rotor body by placing water cooling pipes at the bottom of the winding slots or by drilling water circulation holes through the rotor teeth, but such arrangements are not satisfactory, owing to the fact, that, in the first case, all the faces of the insulation embraced by the supporting teeth are not efficiently utilized as heat abstraction paths, while in the second case, serious constructional difficulties are presented. Owing to the high angular velocity of the rotor and the considerable centrifugal stresses in the body of the rotor teeth it is not possible to provide therein holes of any appreciable size and the accurate drilling of small holes of considerable length presents serious practical difficulties; while the surface of such small holes, if drilled, which would be presented to the influence of the cooling liquid would be so small that the amount of heat which could be abstracted would be limited.

The object of the present invention is to provide an improved liquid cooling system which, while involving no difficulties in construction, yet gives the greatest cooling effect, and this system is not merely confined to the cooling of the windings of the rotor body but also, as far as possible, to the end loops of the windings. A further object of the invention is to provide means for effectively supporting the end loops of the windings against displacement due to momentum and centrifugal forces.

Under my invention I provide slotted channels for the cooling liquid to pass through; these channels, which are of substantial size and extend for nearly the full depth of the copper windings to be cooled, being formed in the teeth of the body of the rotor as well as in teeth formed on the ends of the rotor for supporting the end loops. The channels are, preferably made in the following manner, namely:

The winding slots in the body of the rotor, which are usually cut out of the metal of the rotor, I space a little wider apart to give thicker teeth than usual and, in the center of each tooth, I cut a deep narrow slot the top of which I close by inserting a closure strip, preferably of steel, which would be fusion welded to the rotor metal, thereby forming a cooling channel having considerable cooling surface and, a matter which is of great importance, so located as to be in the closest proximity to the copper coils to be cooled. In the case of the inner coils of the polar group of windings, one face of each coil is in contact with a rotor tooth and the other face may be in contact with the side of the polar face and, for the effective cooling of such "inner" coils, I make narrow cooling channels, similar to those of the rotor teeth, in the polar faces, in proximity to the inner polar slots. It will therefore be seen that, in all cases, the winding slots are located between cooling channels.

If the end supports for the winding loops are made solid with the body of the rotor then, in order to give the end loops effectual support, the teeth of the rotor are prolonged for the full length of the straight parts of the windings, being arranged in pairs of gradually increasing length. The cooling channel in each tooth would be continued also as far as practicable. The curved portions of the end loops, spanning the space between pairs of slots, would be clamped between a series of cross teeth similar to the body teeth but with parallel sides and forming arcs of various lengths. These cross teeth may either be made out of the metal of the rotor or they may be separate therefrom and be secured in place by dovetail joints with key strips and fusion welding or otherwise. The cross teeth would, preferably, be also supplied with liquid cooling channels the same as the longitudinal teeth.

When the coil supports, at each end of the rotor are made separate from the rotor body, I employ a modified arrangement in order to avoid joints in the cooling channels between the rotor body and the separate coil supports at each end.

On the annexed sheets of drawings I have shown, by way of illustration or example, two methods of carrying out the invention.

Figure 1 is a longitudinal vertical section of the rotor of an electrical generator with my improvements applied thereto. The section is taken on the lines A—B, Fig. 2, and $A^1$—$B^1$, Fig. 8, these sections not quite coinciding.

Fig. 2 is a cross section taken on the line C—D, Fig. 1, and drawn to an enlarged scale so as to show the parts more clearly.

Fig. 8 is a developed plan view showing the teeth and slots for the end loops of the rotor winding and also part of the body slots and teeth.

Fig. 9 is a similar plan view of the modification in which the rotor ends are separate from the body of the rotor.

Fig. 10 is a longitudinal section of a rotor with separate ends corresponding with Fig. 9 the section being taken on the line K—L Fig. 9, and $K^1$—$L^1$, Fig. 11, these sections not quite coinciding.

Fig. 11 is a vertical cross section taken on the line M—N Fig. 10, and $M^1$—$N^1$, Fig. 9.

Fig. 12 is a diagram showing the liquid flow.

Fig. 13 is a plan view of a U division piece $d$.

On the drawings the same reference letters and numerals wherever repeated indicate the same or similar parts.

O is the rotor, $O^1$, $O^2$, the journals thereof, P the usual winding slots of the rotor body and Q the usual rotor teeth. The rotor teeth are shown open and without their wedge strip closures. For the purpose of clearness the rotor windings are not shown in their slots.

The ends of the rotor are identical, but with parts reversed, and the description of one will suffice for both.

In the construction shown at Figs. 1 to 8 the cooling of the rotor is effected by means of water or other suitable cooling liquid, supplied under pressure, and which enters the central axial passage $a$ at the end $O^1$ of the rotor and then passes out by radial passage $b$ to spaces $c$ in U shaped division pieces $d$ which are fitted in the rotor so as to cross an annular chamber $e$. This annular chamber, which is shown clearly at Fig. 2, is divided, by the division pieces $d$, into two sub-chambers $e^1$, $e^2$. One of the division pieces is shown in plan Fig. 13 and, as will be seen, it is of U shape and is fitted into the rotor in the same manner as a key. The division pieces may be secured at the back by screws $d^1$. The annular chamber $e$ is closed by an end plate $f$ a tight joint being formed by packing $g$, corrugated metallic ring $h$ welded in place and spigot portion $i$ with packing $j$. These parts are shown more clearly at Figs. 6 and 7. $k$ is the usual washer, $l$ a clamping ring and $m$ a nut for tightening up the washer and end plate.

$s$ designates cooling channels cut in the rotor teeth midway between the winding slots P. As shown clearly at Figs. 2, 3, and 5, they do not extend quite to the full depth of the teeth so as not to reduce the strength thereof. They are each preferably closed by a steel strip $t$ which is fusion welded at $t^1$, $t^2$, Fig. 5, so as to make a thorough joint. The teeth Q are made somewhat broader than the usual practice so as to give compensating strength for any reduction thereof by slotting out the channels. These channels extend the full length of the longitudinal teeth Q of the rotor, as shown.

In Fig. 8 $n$ are radial outflow passages and $x$ similar inflow passages. The passages $n^1$, $n^2$, $n^3$, $n^4$, $n^5$, $n^6$, $n^7$, $n^8$, Fig. 8, communicate between the spaces $c$ and the cross channels $s$, and the passages $x^1$, $x^2$, $x^3$, $x^4$, $x^5$, $x^6$, $x^7$, $x^8$, communicate with the chambers $e^1$ and $e^2$. The other passages $n$ and $x$ communicate with the chambers $e^1$, $e^2$.

Figure 7:
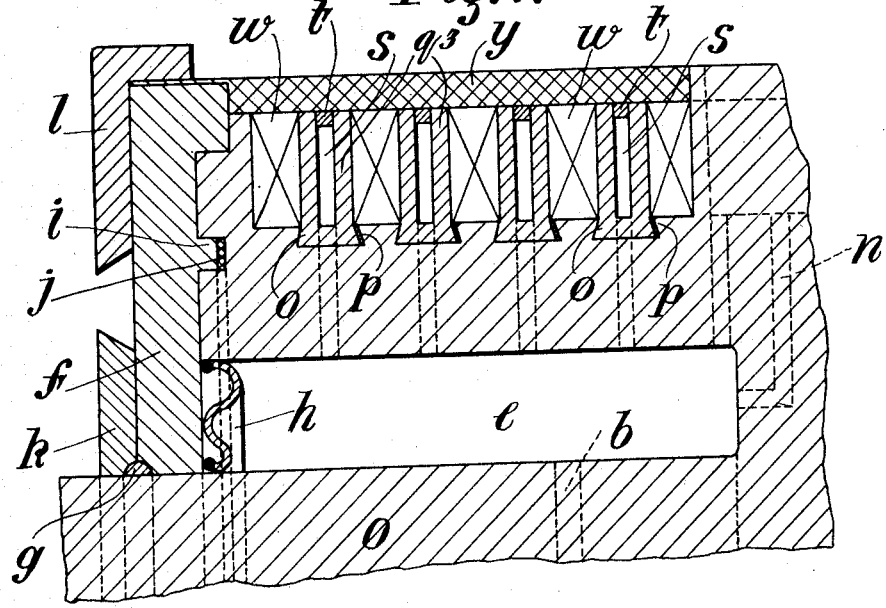
Fig. 7 is an enlarged sectional view of portion of the rotor taken on the line I—J Fig. 8, the end loops and band being shown in position.

The longitudinal teeth Q are extended longer than usual, in the manner shown at Fig. 8, where the extension parts are marked $Q^1$ their corresponding slots being marked $P^1$, so as to form end supports for the end loops and, as will be seen, they gradually increase in length as they recede from the polar faces. One polar face only is shown at Fig. 8. Cross teeth $Q^2$, $Q^3$, are provided between the extension teeth $Q^1$ and these, combined with said extension teeth, give a solid and continuous support to the end loops of the windings. These end loops are not shown but they are inserted in the slots $P^2$, $P^3$, between the teeth in the same manner as for the straight portions of the rotor winding. The enlarged view, Fig. 7, shows the cross teeth $Q^3$, the cross teeth $Q^2$ being similarly constructed and, as will be seen, these teeth are dove-tailed at $o$ and secured in dovetailed slots in the rotor by key pieces $p$ and fusion welding. Owing to the fact that the cross teeth are circumferentially fitted they are curved to correspond with the surface of the rotor. The cross teeth are preferably provided with channels $s$ and closures $t$ the same as the longitudinal teeth shown in Fig. 5.

Figure 6:
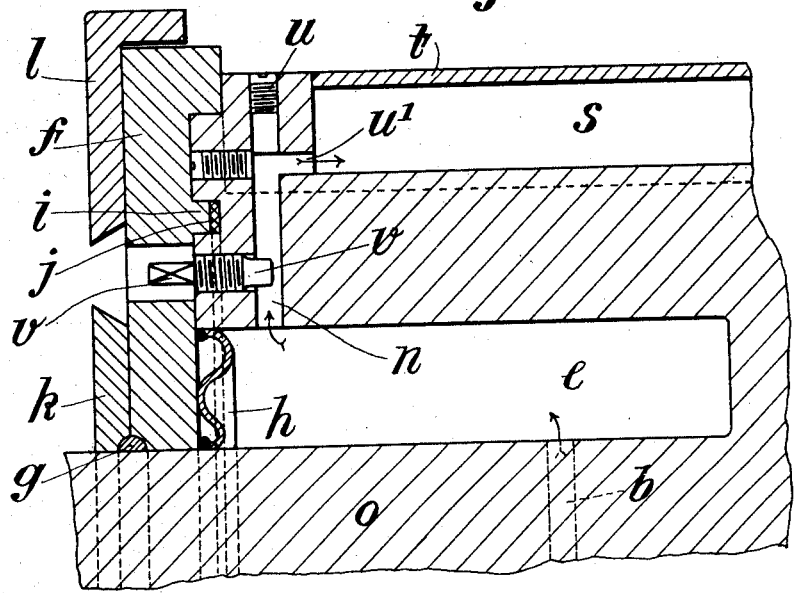
Fig. 6 is an enlarged sectional view of a portion at one end of the rotor the section being taken on the line G—H Fig. 8.

The outer end of each radial passage is closed by a screw plug $u$, one being shown, by way of example, at Fig. 6.

For the purpose of controlling the flow of liquid through the channels screw valves $v$ may be provided as shown, by way of example, at Fig. 6. $u^1$ are passages communicating between the channels $s$ and radial passages $n$.

As will be seen at Fig. 7 the five end loops $w$ are shown, in section, in their slots and the band $y$ is also shown.

I will now describe the path of the cooling liquid for one cross channel and its corresponding longitudinal channel, with reference to the diagram Fig. 12, and the plan view Fig. 8 as well as Figs. 1 and 2. The section Fig. 2 being taken on the line C—D, Fig. 1, I deal with the fourth cross tooth $Q^2$ (Figs. 1 and 8) and the inner longitudinal tooth Q.

The cooling liquid flows from the inlet $a$ up the passage $b$ to the top space $c$ and from thence by passage $n^4$ to cross channel $s^1$, and inward again by passage $x^1$ to chamber $e^1$, then outward again by passage $n^9$ to the longitudinal channel $s^2$ and along to the opposite end of the rotor where it passes inward by passage $x^9$ to chamber $e^1$ at this end of rotor, outward again by passage $n^{10}$ along cross channel $s^3$ and inward again by passage $x^{10}$ to space $c^1$, channel $b^1$ and outlet $a^1$.

In the case of the longitudinal channels $s$ Fig. 8, the liquid always flows outward from the chambers $e$, $e^1$, directly by the passages $n$ to the channels but, in the case of the cross channels $s$ the liquid has to first flow into the spaces $c$, $c^1$, then along the cross channels and inward again to the chambers $e$, $e^1$. This inward and outward flow, in the case of the cross channels is necessitated by the cross teeth being separate from the longitudinal teeth and the desire to avoid special joints for the connection of the cross channels to the longitudinal channels which would, otherwise, be necessary.

The above description will suffice to enable the system of flow to be readily understood for all the channels.

Figure 3:
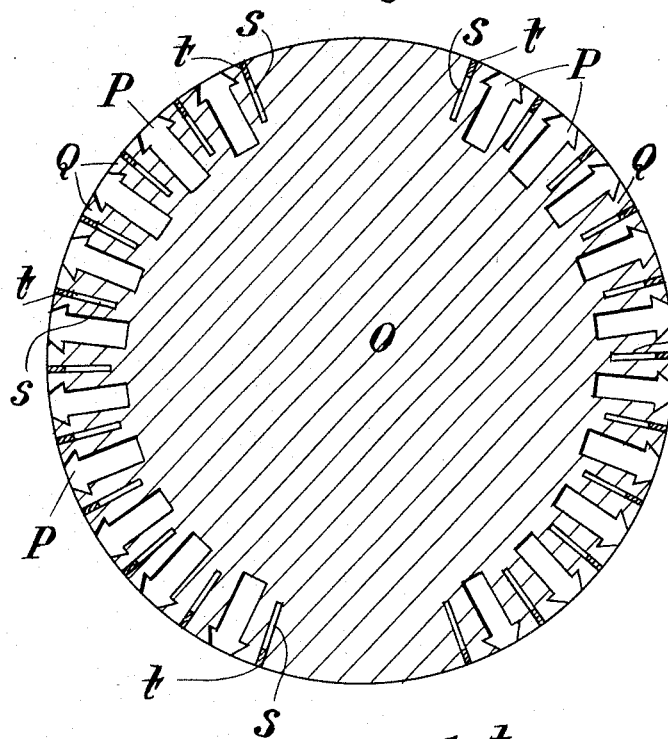
Fig. 3 is a cross section on the line E—F Fig. 1, and drawn to an enlarged scale so as to show the rotor slots and cooling channels more clearly.
Figure 4:
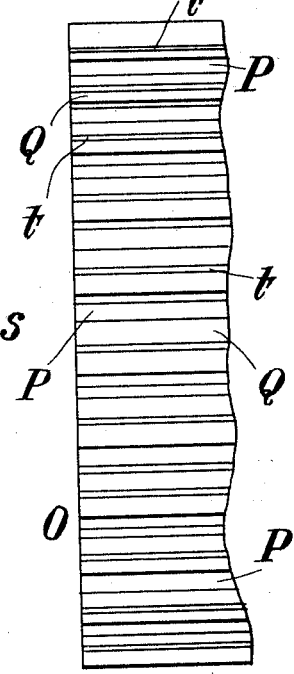
Fig. 4 is a partial elevation corresponding to Fig. 3 and showing the alternately arranged rotor slots and cooling channels.

The channels of the rotor body appear as at Fig. 3 and are not only made in the rotor teeth but in the polar faces, at top and bottom and, as will be seen, the arrangement is such that each winding slot P is between two channels with the result that the maximum cooling effect is obtained.

In the modification shown at Figs. 9, 10 and 11 the ends $O^3$, $O^4$, of the rotor are separate from the body or core and secured to the reduced ends thereof. The removable ends as shown (Fig. 9) have longitudinal teeth $Q^1$ on them and which, when the ends are fitted in place form extensions of the rotor teeth Q, and also cross teeth $Q^2$, $Q^3$, these cross teeth being cut or formed on each end or keyed thereto in the manner hereinbefore described with reference to Fig. 8. In order to strengthen and solidly support the ends, each end is made with an inner helical thread $z$ thereon adapted to rest solidly on the reduced parts of the rotor body. Instead of using the separate division pieces $d$ as hereinbefore described, I may, in this case, make the interior surface of each end with two parallel ribs $d^2$ forming partitions and which divide the spaces $c$ $c$, from the chamber $e$ which, in this case, is of spiral form owing to the helical thread $z$. The partitions $d^2$ are adapted to rest solidly upon the reduced ends of the rotor and the helical thread terminates at each side of these partitions in the manner shown in Figs. 10 and 11. In order to avoid making joints in the water channels $s$ where the separate ends connect to the body special inflow passages $x$ and outflow passages $n$ are provided for the longitudinal channels $s$ and are adapted to communicate with the chamber $e$. For the effectual locking of the ends to the body each end is made with a spigot portion $q$ which fits into a faucet recess made in the body and is packed with packing $j$. The ends are tightened up, in position, by means of nuts $m$.

In this modification the water passing through the inlet $a$ and the passages $b$ flows into the spaces $c$ and thence by the radial passages $n^1$, $n^2$, $n^3$, $n^4$, (Fig. 9) to the cross channels $s$ and returns to the chamber $e$ by means of the passages $x$ and then circulates around this chamber in the spiral passageway formed by the helical thread $z$ and then flows out by the passages $n$, as before, to the longitudinal channels $s$. The flow will be readily understood from the explanations given in connection with the arrangement shown, Figs. 1 to 8.

It will be seen in both arrangements the end coils are effectively cooled by the liquid circulating in the spaces $c$ and chambers $e$ the liquid flowing through these spaces rapidly abstracting the heat. The channels $s$ are not so necessary in the case of the end loops owing to the internal water circulation being so good but, when used, they add to the effectiveness thereof.

Figure 5:
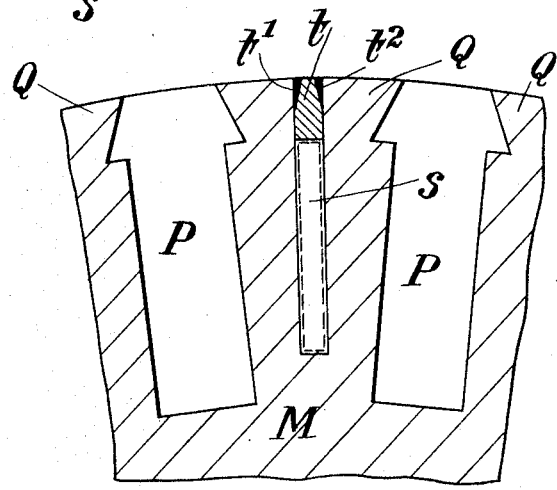
Fig. 5 is a cross-sectional view of two rotor slots and their intermediate cooling channel drawn to a much enlarged scale.

When the rotor is built up of separate plates or disks, cooling channels $s$ would be provided as described but the cooling liquid would then be contained in a metal liner as indicated in dotted lines Fig. 5, having the same cross sectional profile as the channel and tightly fitted therein by expansion or by insertion of metal foil around the liner. The arrangements for water circulation would generally be as hereinbefore described.

It will be seen, with this invention, the end loops are effectively supported as well as effectively cooled which is a very great advantage in connection with high speed turbo-generators.

Although I have described the cooling channels $s$ as being closed by closure strips $t$ they may be closed in any other equivalent manner so as to constitute effective liquid passageways in close proximity to the windings.

Having now fully described my invention what I claim and desire to secure by Letters Patent is:—

1. A rotor of an electric generator or motor having longitudinal teeth with slots therebetween for the straight portions of the windings, cross teeth with slots therebetween for the end loops of the windings, and means for cooling by liquid circulation both the straight portions of the windings and the end loops.

2. A rotor of an electric generator or motor having longitudinal teeth with slots therebetween for the straight portions of the windings, cross teeth with slots therebetween for the end loops of the windings, and channels in the teeth for cooling by liquid circulation both the straight portions of the windings and the end loops.

3. A rotor of an electric generator or motor having longitudinal teeth with slots therebetween for the straight portions of the windings, cross teeth with slots therebetween for the end loops of the windings, said cross teeth being separate from the longitudinal teeth and being secured to the rotor, and means for cooling by liquid circulation both the straight portions of the windings and the end loops.

4. A rotor of an electric generator or motor having longitudinal teeth with slots therebetween for the straight portions of the windings, cross teeth with slots therebetween for the end loops of the windings, said cross teeth being separate from the longitudinal teeth and being dovetail jointed to the rotor, and liquid circulating means having a supply inlet and discharge outlet for cooling by liquid circulation both the straight portions of the windings and the end loops.

5. A rotor of an electric generator or motor having longitudinal teeth with slots therebetween for the straight portions of the windings, cross teeth with slots therebetween for the end loops of the windings, channels in the teeth, passages and chambers in the rotor for cooling by liquid circulation both the straight portions of the windings and the end loops, and a liquid inlet and outlet for causing the liquid to flow radially outward to a chamber in the rotor then radially outward to and through the cross teeth at one end of the rotor, then, again, radially inward to the chamber, and then, again, radially outward to and through the longitudinal teeth of the rotor, and, thereafter, in a similar manner through the cross teeth at the opposite end of the rotor before passing to the outlet.

6. A rotor of an electric generator or motor having longitudinal teeth with slots therebetween for the straight portions of the windings, cross teeth with slots therebetween for the end loops of the windings, means for cooling by liquid circulation both the straight portions of the windings and the end loops, and means for controlling the circulation of the liquid.

7. A rotor of an electric generator or motor having longitudinal teeth for the straight portions of the windings, and cross teeth for the end loops of the windings, there being connected liquid circulation passages through said teeth for cooling by liquid circulation the windings and end loops, there being a liquid inlet to the said passages at one end of the rotor and a liquid discharge outlet at the other end of the rotor.

8. A rotor of an electric generator or motor having longitudinal teeth for the straight portions of the windings, cross teeth for the end loops of the windings, there being connected liquid circulation passages through said teeth for cooling by liquid circulation the windings and end loops, there being a liquid inlet to the said passages at one end of the rotor and a liquid discharge outlet at the other end of the rotor, and means for controlling the flow of the liquid through the said passages.

In testimony whereof I affix my signature in presence of two witnesses.

JOSEPH SHEPHERD.

Witnesses:
 MARY GREEN,
 KATE WALKER.